(12) United States Patent
Zhang et al.

(10) Patent No.: US 12,020,398 B2
(45) Date of Patent: Jun. 25, 2024

(54) 3D RECONSTRUCTION METHOD AND APPARATUS

(71) Applicant: The 38th Research Institute of China Electronics Technology Group Corporation, Hefei (CN)

(72) Inventors: Hongqi Zhang, Hefei (CN); Yixiong Wei, Hefei (CN); Qianhao Wu, Hefei (CN); Hongqiao Zhou, Hefei (CN)

(73) Assignee: The 38th Research Institute of China Electronics Technology Group Corporation, Hefei (CN)

( * ) Notice: Subject to any disclaimer, the term of this patent is extended or adjusted under 35 U.S.C. 154(b) by 357 days.

(21) Appl. No.: 17/513,834

(22) Filed: Oct. 28, 2021

(65) Prior Publication Data

US 2023/0103385 A1 Apr. 6, 2023

(30) Foreign Application Priority Data

Sep. 28, 2021 (CN) .......................... 202111143351.4

(51) Int. Cl.
*G06T 3/4038* (2024.01)
*G06T 7/00* (2017.01)
(Continued)

(52) U.S. Cl.
CPC .............. *G06T 3/4038* (2013.01); *G06T 7/80* (2017.01); *G06T 7/97* (2017.01); *G06V 10/44* (2022.01);
(Continued)

(58) Field of Classification Search
CPC ........... G06T 3/4038; G06T 7/80; G06T 7/97; G06T 2207/10028; G06T 2207/30204;
(Continued)

(56) References Cited

U.S. PATENT DOCUMENTS

| 6,565,003 | B1 * | 5/2003 | Ma ...................... G06K 7/1417 |
| | | | 235/462.11 |
| 7,046,840 | B2 * | 5/2006 | Chang ..................... G06T 7/593 |
| | | | 382/164 |

(Continued)

OTHER PUBLICATIONS

Kowalski et al., LiveScan3D: A Fast and Inexpensive 3D Data Acquisition System for Multiple Kinect v2 Sensors, 2015 International Conference on 3D Vision (Year: 2015).*

(Continued)

*Primary Examiner* — Andrae S Allison

(57) ABSTRACT

Provided are a 3D reconstruction method and apparatus, an electronic device and a storage medium. The 3D reconstruction method comprises: using a plurality of cameras with different viewing angles to image a symbol to obtain a symbol image, a reference object for camera calibration being called the symbol, the symbol including a plurality of markers, and each of the markers having a corresponding ID number; identifying the ID number of the marker in the symbol image and searching for world coordinates corresponding to the marker according to the ID number; computing an external parameter matrix of the camera according to marker coordinates of a camera coordinate system and marker coordinates of a world coordinate system, and unifying point clouds under the world coordinate system to obtain a plurality of point clouds under different viewing angles; and stitching the plurality of point clouds together to obtain a 3D reconstructed image.

9 Claims, 11 Drawing Sheets

(51) Int. Cl.
*G06T 7/80* (2017.01)
*G06V 10/44* (2022.01)
*G06V 10/46* (2022.01)

(52) U.S. Cl.
CPC .. *G06V 10/462* (2022.01); *G06T 2207/10028* (2013.01)

(58) Field of Classification Search
CPC .... G06V 10/44; G06V 10/462; G06V 10/245; G06V 20/64
See application file for complete search history.

(56) References Cited

U.S. PATENT DOCUMENTS

| | | | | |
|---|---|---|---|---|
| 2015/0363625 | A1* | 12/2015 | Wu | G06V 20/10 382/203 |
| 2016/0267661 | A1* | 9/2016 | Moteki | G06T 7/593 |
| 2017/0124441 | A1* | 5/2017 | Picard | G06K 19/06075 |
| 2020/0388004 | A1* | 12/2020 | Zhang | G06T 3/0075 |

OTHER PUBLICATIONS

S.-J. Lee, G. Tewolde, J. Lim and J. Kwon, "QR-code based Localization for Indoor Mobile Robot with validation using a 3D optical tracking instrument," 2015 IEEE International Conference on Advanced Intelligent Mechatronics (AIM), Busan, Korea (South), 2015, pp. 965-970, (Year: 2015).*

Krishna Murthy et al. "VSLAM: Automagically differentiable SLAM." (2020). (Year: 2020).*

Wu, Xin-sheng, Lian-zhi Qiao, and Jun Deng. "A new method for bar code localization and recognition." 2009 2nd International Congress on Image and Signal Processing. IEEE, 2009. (Year: 2009).*

* cited by examiner

3D RECONSTRUCTION METHOD AND APPARATUS

CROSS-REFERENCE TO RELATED APPLICATION

This application claims priority from the Chinese patent application 2021111433514 filed Sep. 28, 2021, the content of which are incorporated herein in the entirety by reference.

TECHNICAL FIELD

The present disclosure belongs to the field of image acquisition technologies, and particularly relates to a 3D reconstruction method and apparatus, an electronic device, and a storage medium.

BACKGROUND

In recent years, 3D (Three-Dimensional) reconstruction is a popular direction in the field of computer vision and computer graphics. This technology is widely used in reverse engineering, CT imaging, cultural relic display, mixed reality, and the like. Microsoft officially released a new generation of Azure-Kinect depth sensor in 2019. This device measures distance based on a TOF (Time Of Flight) method. Compared with the previous two generations of Kinect depth sensors, the new generation of Azure-Kinect depth sensor is further improved in accuracy, field of view, and resolution. Due to portability and low-cost hardware, more and more scholars are attracted to invest in the research of 3D reconstruction technology.

At present, most of the camera's external parameter calibration is done based on a calibration object. This type of method has the advantages of mature theory, simple operation and high accuracy. However, due to cumbersome image acquisition process, complex calibration object production, and overlapping field of view limitations, the application scenarios of this type of method are greatly restricted.

SUMMARY

An objective of the present disclosure is to provide a 3D reconstruction method and apparatus, an electronic device and a storage medium to solve a problem that an existing 3D reconstruction process is cumbersome and complex.

According to a first aspect of embodiments of the present disclosure, a 3D reconstruction method is provided, and the method may include:

using a plurality of cameras with different viewing angles to image a symbol to obtain a symbol image, a reference object for camera calibration being called the symbol, the symbol including a plurality of markers, and each of the markers having a corresponding ID number;

identifying the ID number of the marker in the symbol image and searching for world coordinates corresponding to the marker according to the ID number;

computing an external parameter matrix of the camera according to marker coordinates of a camera coordinate system and marker coordinates of a world coordinate system, and unifying point clouds under the world coordinate system to obtain a plurality of point clouds under different viewing angles; and stitching the plurality of point clouds together to obtain a 3D reconstructed image.

DESCRIPTION OF EMBODIMENTS

Figure 1:
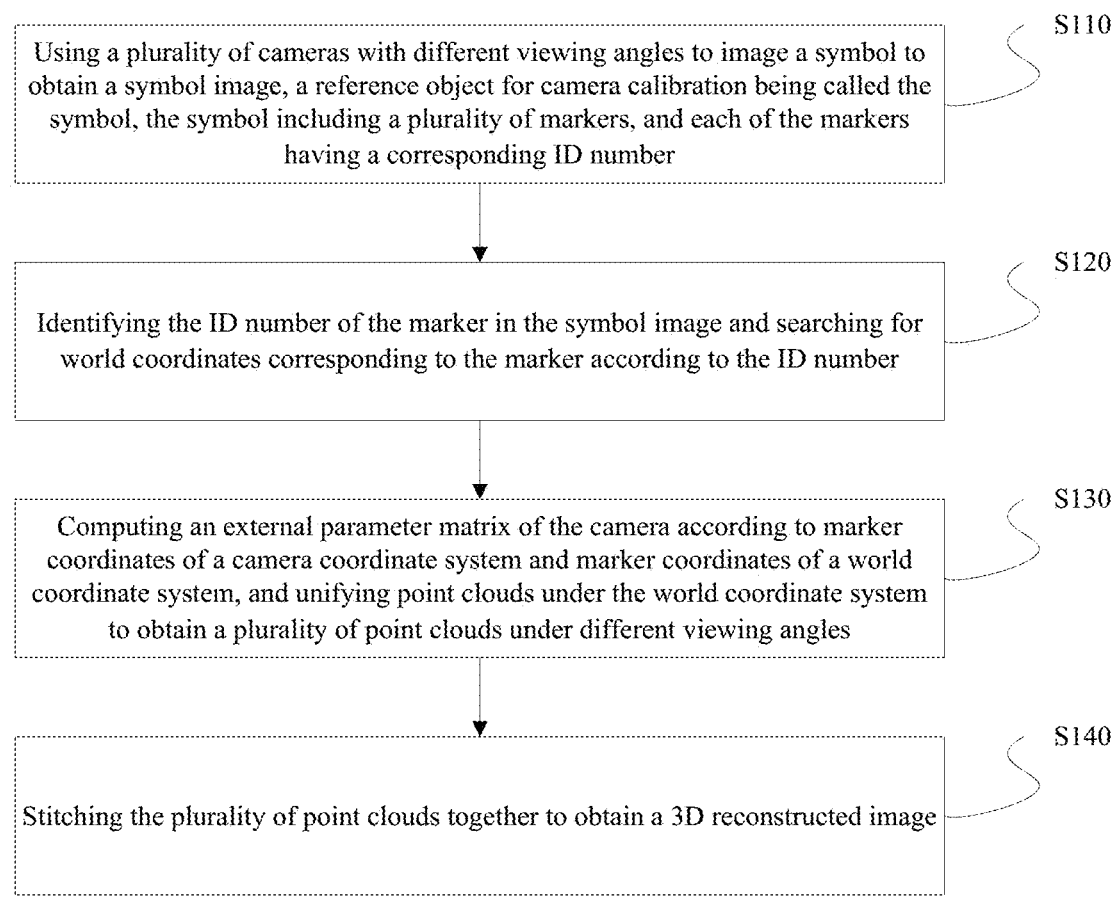
FIG. 1 is a flowchart of a 3D reconstruction method according to an exemplary embodiment of the present disclosure.

In order to make the objectives, technical solutions and advantages of the present disclosure more clear, the following further describes the present disclosure in detail in conjunction with specific embodiments and with reference to the accompanying drawings. It should be understood that these descriptions are only exemplary, but not intended to limit the scope of the present disclosure. In addition, in the following description, descriptions of well-known structures and technologies are omitted to avoid unnecessarily obscuring the concept of the present disclosure.

The drawings show schematic structural diagrams of layers according to embodiments of the present disclosure. The drawings are not drawn to scale, in which some details are exaggerated for clarity purposes, and some details may be omitted. The shapes of the various areas and layers shown in the drawings, as well as the relative size and positional relationship between them are only exemplary. In practice, there may be deviations due to manufacturing tolerances or technical limitations. Those skilled in the art can design additional areas/layers having different shapes, sizes, and relative positions according to actual needs.

Obviously, the described embodiments are only a part of, not all the embodiments of the present disclosure. All other embodiments obtained by a person of ordinary skill in the art based on the embodiments of the present disclosure without creative efforts shall fall within the protection scope of the present disclosure.

In the description of the present disclosure, it should be noted that the terms "first", "second", and "third" are only used for description, and cannot be understood as indicating or implying relative importance.

In addition, the technical features involved in the different embodiments of the present disclosure described below can be combined with each other as long as they do not conflict with each other.

A point cloud is a set of discrete 3D coordinate points on a target surface. Due to the range limitation and occlusion influence on the camera's field of view, scanning by a single camera can only obtain local surface features of an object. In order to obtain a complete surface model of the object, it is required to arrange multiple cameras in 360 degrees and unify point cloud data under different viewing angles under a same world coordinate system in combination with external parameters of the cameras. Since the acquisition of the external parameters of the cameras involves external parameter calibration of the cameras, the external parameter calibration of the cameras is an important process in 3D reconstruction. The inventor finds that the classic iterative closest point (ICP) algorithm and its various variants have problems such as inability to process low-overlap point cloud data, excessive reliance on features such as normal vectors and curvature, and low speed. In view of this, the present disclosure provides a 3D reconstruction method to improve the reconstruction speed.

The 3D reconstruction method according to an embodiment of the present disclosure will be described in detail below with reference to the accompanying drawings, through specific embodiments and application scenarios thereof.

As shown in FIG. 1, according to a first aspect of the embodiments of the present disclosure, a 3D reconstruction method is provided, and the method may include:

step S110: using a plurality of cameras with different viewing angles to image a symbol to obtain a symbol image, a reference object for camera calibration being called the symbol, the symbol including a plurality of markers, and each of the markers having a corresponding ID number;

step S120: identifying the ID number of the marker in the symbol image and searching for world coordinates corresponding to the marker according to the ID number;

step S130: computing an external parameter matrix of the camera according to marker coordinates of a camera coordinate system and marker coordinates of a world coordinate system, and unifying point clouds under the world coordinate system to obtain a plurality of point clouds under different viewing angles; and step S140: stitching the plurality of point clouds together to obtain a 3D reconstructed image.

According to the method of the above embodiment, the input marker ID (ID number) and a rotation angle and translation distance under the corresponding world coordinate system are used as priors; extraction is performed for marker detection and ID identification; corresponding transformation parameters are retrieved according to the identified ID, the corresponding external parameter matrix is computed in combination with the analysis and inverse operation, and the 3D reconstruction is realized through stitching. The method has faster convergence and higher accuracy, and the method is simple in process and easy to operate and implement.

In order to make the description more clear, the above steps will be explained separately as follows.

First, the description goes to step S110: using a plurality of cameras with different viewing angles to image a symbol to obtain a symbol image, a reference object for camera calibration being called the symbol, the symbol including a plurality of markers, and each of the markers having a corresponding ID number.

In this step, the symbol is preset as the reference for external parameter calibration. The symbol includes the plurality of markers, and each of the markers is a black pentagonal marker; that is, each of the markers has five corners; the inside of the marker is a coded area, including nine square areas of the same size. The nine square areas correspond to a nine-digit binary number, and each square area corresponds to a digit of the binary number. The binary number corresponds to the color of the square area, Black represents 1, and White represents 0; first four digits correspond to the marker ID, the next four digits represent the marker ID in the opposite color, and the last digit represents a parity bit.

As an example, if the first four digits of the marker ID are 0101, the next four digits of the marker ID should be 1010. If the next four digits of the marker ID are not 1010, it means that the marker ID is misdetected. The last digit represents the parity bit and uniformly uses 1 or 0 to indicate misdetection of the marker ID. This coding method can reduce the false positive rate of marker detection.

Then, the cameras are used for image acquisition for the symbol to obtain the symbol image. The symbol image here is a color image, and the color image of the symbol can be preprocessed. The preprocessing can include: first performing gray-scale processing on the color image of the symbol to obtain a gray-scale image of the symbol; and then binarizing the gray-scale image of the symbol by using a threshold segmentation function to obtain a binary image of the symbol. Background noise of the binary image of the symbol obtained after preprocessing is reduced greatly, which facilitates the subsequent marker detection.

Next, the description goes to step S120: identifying the ID number of the marker in the symbol image and searching for world coordinates corresponding to the marker according to the ID number.

In this step, a contour query is performed on the binary image of the symbol, and each contour queried is composed of a set of continuous points. As an example, a contour can be stored in a Contours[ ] vector list. Then, each contour is traversed and a bounded area is computed. If the area is too small or too large, it is determined that a polygon is not a marker, and then a polygon fitting function is called to detect corners on each of the contours. If it is detected that the number of corners of a certain contour is 5 and a polygon fitted from the contour is a non-convex polygon, it is determined that the polygon fitted from the contour is a marker, and coordinates of the detected five corners on the contour are saved as a corner vector $V_k^j$, where k represents a viewing angle corresponding to the camera, and j represents coordinates of a j-th corner, where j=1, 2, 3, 4, 5.

After the marker detection, there are still a few "pseudo markers" among the markers. In this case, further verification is performed according to the detection marker ID, and the detected marker is subjected to marker ID identification. The marker ID identification depends on values of black and white pixels in the coded area of the marker. Since it takes a long time to traverse the pixel value of each pixel in the entire coded area, the total value of pixels in the nine square areas in the coded area of the marker is computed, and a nine-digit binary number corresponding to the marker can be decoded by using the total value of pixels in the nine square areas in the coded area of the marker, thus obtaining the marker ID.

An integral graph is used to compute the total value of pixels in the square areas as follows: the coordinates of the four vertices of a square area are (x1, y1), (x2, y1), (x1, y2), and (x2, y2)) respectively, the pixel values of the four vertices are I(x1, y1), I(x2, y1), I(x1, y2), and I(x2, y2) respectively, and then the total value of pixels in the square area is computed as I(x1, y1)+I(x2,y2)−I(x2,y1)−I(x1,y2).

In actual application, the marker cannot always face a device lens directly, and the coded area of the marker is distorted in a pixel plane, which causes an error in the marker ID identification. Therefore, pre-defined standard corner coordinates of the marker are stored as a standard corner vector $\omega_k^j$, where k represents the viewing angle corresponding to the camera, and j represents coordinates of a j-th corner, where j=1, 2, 3, 4, 5.

A transformation matrix H (H∈R3×3) between the detected corner vector $V_k^j$ and the corresponding standard corner vector $\omega_k^j$ is computed by homograph, and then perspective transformation is performed by using the transformation matrix H, thereby correcting the original image (i.e., the symbol image collected by the camera) to the plane of the standard corner coordinates.

According to the color image and a depth image captured by the camera and in combination with the camera, the detected corner vector $V_k^j$ is back-projected to a 3D space to obtain a 3D corner vector $\hat{V}_k^j = [X, Y, Z]^T$.

The description then goes to step S130: computing an external parameter matrix of the camera according to marker coordinates of a camera coordinate system and marker coordinates of a world coordinate system, and unifying point clouds under the world coordinate system to obtain a plurality of point clouds under different viewing angles.

In this step, in order to remove outliers and reduce noise, continuous n frames of images are used to compute mean coordinates. In this embodiment, n=20. Under the viewing angle k corresponding to the camera, a translation vector $T_C^k (T_c^k \in T^{3\times1})$ and a rotation matrix $R_C^k (R_c^k \in R^{3\times3})$ are defined, and the transformation from the camera coordinate system to the marker coordinate system is as follows:

$$P_M^k = R_c^k(P_C^k - T_c^k);$$

where $P_C^k$ and $P_M^k$ represent a point cloud model of the marker under the camera coordinate system and a point cloud model of the marker under the marker coordinate system, respectively; a subscript C represents the camera coordinate system, a subscript M represents the marker coordinate system, and k represents the viewing angle corresponding to the camera;

the translation vector $T_C^k$ can be simplified to marker center coordinates computed according to the 3D corner $\hat{V}_k^j$;

The rotation matrix $R_C^k$ is obtained by orthogonal Procrustes analysis. In order to eliminate the influence of a translation component, the detected 3D corner $\hat{V}_k^j$ and the predefined standard corner vector $\omega_k^j$ are normalized; that is, a corresponding mean value of each coordinate point is subtracted from each coordinate point, a corresponding relationship $\hat{V}_k^j \leftrightarrows \omega_k^j$, j=1, ..., 5 between the 5 points is established using a corner sorting algorithm, and then the computing of the rotation matrix can be expressed as:

$$\min \|\hat{V}_k^j R_C^k - \omega_k^j\|_F \text{ s.t. } (R_C^k)^T R_C^k = I;$$

according to the Procrustes analysis, the above expression formula can be equivalent to:

$$\max tr(MR_C^k);$$

in the formula, $M=(\omega_k^j)^T \hat{V}_k^j$; SVD decomposition is carried out on M to obtain $M=USV^T$, the above is equivalent to maximization:

$$tr(MR_C^k) = tr(USV^T R_C^k) =$$
$$tr(SV^T R_C^k U) = \quad ;$$
$$tr(SZ)$$

if and only if $Z=I_{3\times3}=V^T R_C^k U$, the above formula satisfies the maximization condition, the final rotation matrix $R_C^k$ is computed as follows:

$$R_C^k = VU^T;$$

the space position of the marker is a parameter obtained by manual input. As an example, four markers with different IDs are pasted around a carton with a size of 60×40×33 cm³, the marker on the front is set as the origin, and the marker on the back can be regarded as a rotation of 180° around the Y axis and a translation of 40 cm along the Z axis. In this way, once the camera under the viewing angle k detects the marker, a corresponding pre-input position prior can be obtained through the marker ID identification, and finally the point clouds are unified under the world coordinate system:

$$P_W^k = R_M^k P_M^k + T_M^k;$$

where $P_W^k$ represents a point cloud model under the world coordinate system, and $R_M^k$ and $T_M^k$ represent respectively a rotation parameter and a translation parameter input manually.

The external parameter calibration is respectively carried out on the cameras with different viewing angles, and the point clouds under various viewing angles are unified under the world coordinate system. The point clouds under the same viewing angle, i.e., under the same camera, are located in the corresponding camera coordinate system. The purpose of external parameter calibration is to transform the point clouds under different camera coordinate systems to the same world coordinate system to complete point cloud stitching.

The description finally goes to step S140: stitching the plurality of point clouds together to obtain a 3D reconstructed image.

In this step, a set of target point set $P=\{p_i | p_i \in R^3, i=1, 2, \ldots, n\}$ and source point set $Q=\{q_i | q_i \in R^3, i=1, 2, \ldots, n\}$ having overlapping areas can be given. The optimal match between the two point clouds can be found through an ICP algorithm by minimizing an energy function $$\varepsilon(R, t) = \frac{1}{N_p} \sum_{i=1}^{N_p} \|p_i - Rq_i - t\|^2,$$

and a Euclidean distance between associated point pairs in the ICP is replaced with a distance from a point to a tangent plane. This method has a small epoch and is not easy to fall into a local optimal solution. However, since the above-mentioned ICP and its variants only use the geometric characteristics of the surface of an object, in a scene with less geometric features such as a smooth surface, a large number of mismatched points will be generated. Therefore, it is required to extend a joint optimization objective function on the basis of the classic ICP algorithm:

$$\varepsilon(T) = (1-\delta)\varepsilon_C(T) + \delta\varepsilon_G(T);$$

where T∈SE(3) represents an estimated transformation matrix, $\varepsilon_C$ represents a color term, $\varepsilon_G$ represents a geometric term, and δ∈[0,1] represents a weight variable; the selection of the corresponding point pair (p,q)∈$\mathcal{M}$ is the same as that in an ICP algorithm, which is to minimize the Euclidean distance of points; for a corresponding point set $\mathcal{M}$, the geometric term and the color term of an objective function are respectively constructed as follows:

$$\varepsilon_G(T) = \Sigma_{(p,q)\in \mathcal{M}}((Tq-p)^T n_p)^2;$$

$$\varepsilon_C(T) = \Sigma_{(p,q)\in \mathcal{M}}(C_p(f(Tq)) - C(q))^2;$$

where $n_p$ represents a normal vector of the corresponding point p; therefore, $\varepsilon_G$ is equivalent to a distance from a source point to a tangent plane of a target point; f( ) is a function for back-projecting the 3D point to the tangent plane of the target point cloud; CP( ) is a function for parameterizing a virtual image and can be expressed as a continuous color function C( ), i.e., the color value of the corresponding coordinate; and finally iterative optimization is carried out by using a Gauss-Newton method.

Figure 2:
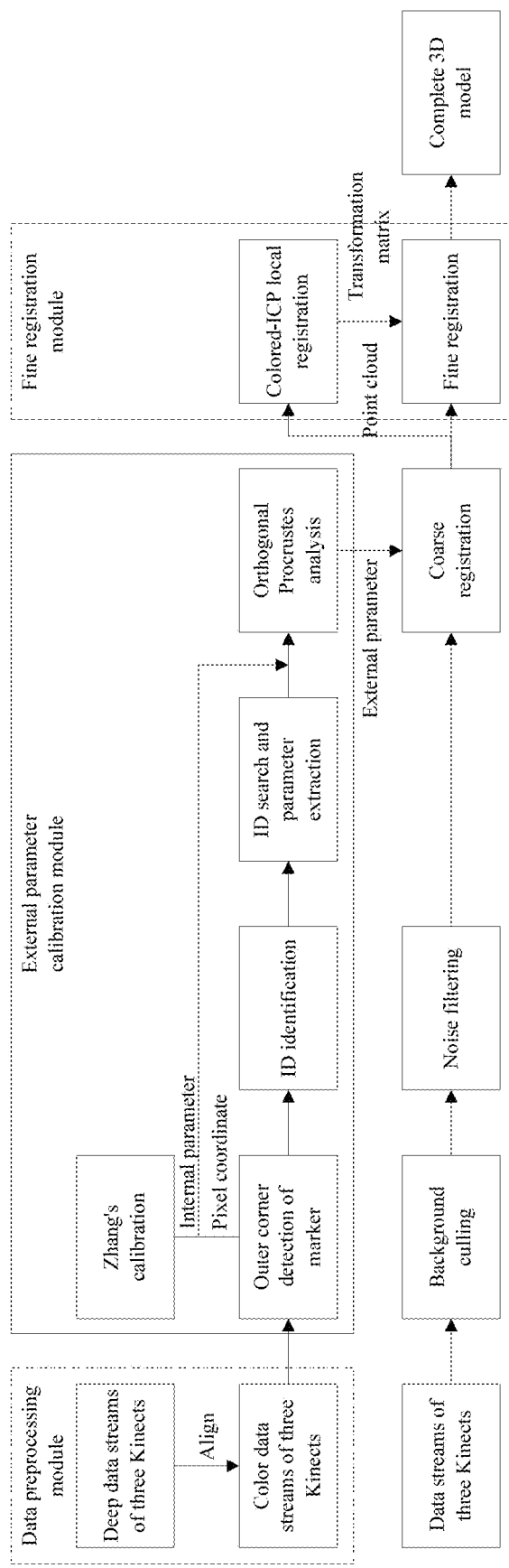
FIG. 2 is a flowchart of a 3D reconstruction method according to a specific exemplary embodiment of the present disclosure.

As shown in FIG. 2, in a specific embodiment of the present disclosure, a 3D reconstruction method is provided, and the method includes two stages. The first stage includes marker detection and external parameter calibration. In this stage, RGB images corresponding to multiple viewing angles are first extracted for corner detection, an integral graph is computed after perspective transformation of the extracted ROI area to determine the marker ID under the corresponding viewing angle; then, corresponding world coordinates of the marker are searched according to the ID and the external parameters of the camera are solved by the orthogonal Procrustes analysis. The second stage includes the local registration optimization based on Colored-ICP, and by joint optimization of color terms and geometric terms, the fine registration stage has faster convergence and higher accuracy. Finally, a 3D reconstruction model is transmitted to a mixed reality device HoloLens2 in real time, achieving a better virtual interaction effect.

Figure 3:
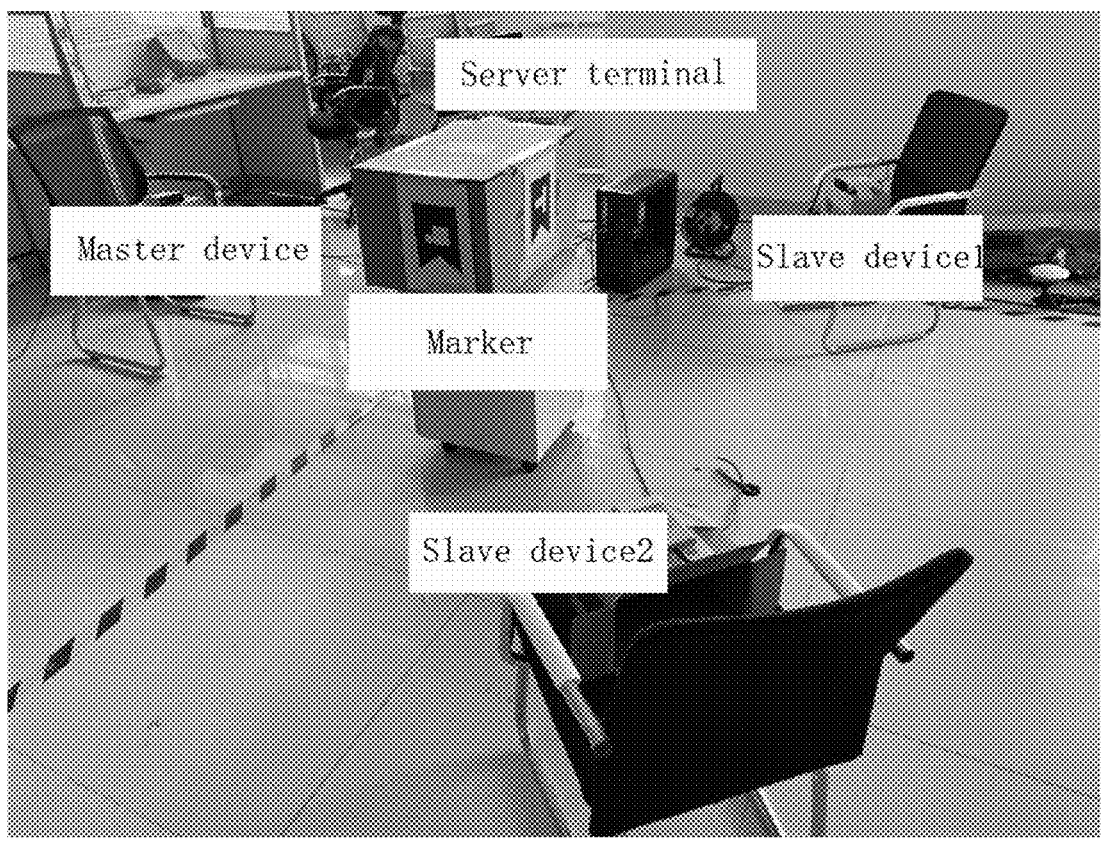
FIG. 3 shows an experimental environment of 3D reconstruction according to an exemplary embodiment of the present disclosure.

Hardware devices in this embodiment include three Azure-Kinect devices to form a depth acquisition system, and one PC server is used to process point cloud data, as shown in FIG. 3; an Azure-Kinect TOF depth camera has a resolution of 1 million pixels, and an RGB camera has a resolution of 12 million pixels and a working range of 0.25 to 5.46 m, the computer system is configured as Intel® Core™ i5-9400F CPU@2.90 GHz, 8.0 GB, RAM, the algorithm is implemented in C++ language, and the camera terminal is equipped with an API to call Azure-Kinect-SDK.

In an external parameter calibration experiment of the camera, the selection of a calibration object should meet the following conditions: the calibration object should be of a regular shape, which is convenient for the detection of the symbol; the calibration object should be not easy to produce non-rigid deformation which affects the calibration accuracy. Based on the above conditions, a rectangular parallelepiped carton is selected as the calibration object, and A4 paper-sized symbol markers with different IDs are pasted on all sides. The three devices are spaced by about 120°, forming a scanning area with a radius of 1.5 m, as shown in FIG. 3.

Figure 4A:
FIGS. 4A-4B are schematic diagrams of checkerboard calibration according to an exemplary embodiment of the present disclosure.
Figure 4B:
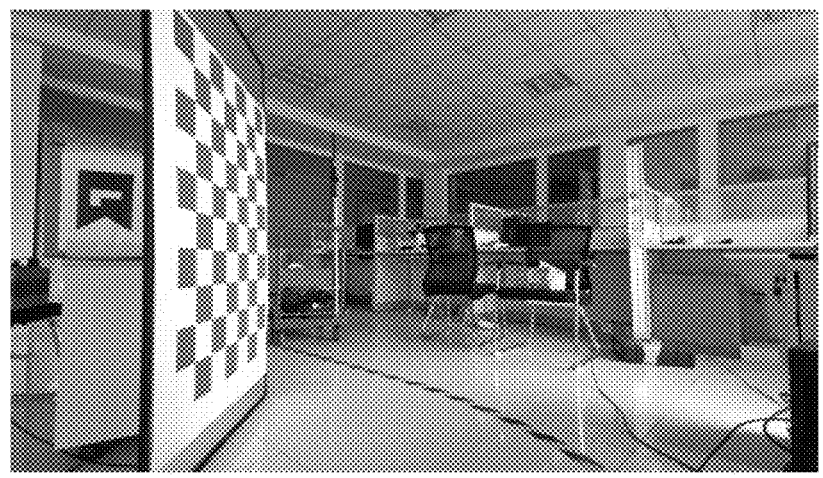

The following table 1 lists the pre-input world coordinates of the marker. For comparison with the classic Zhang's calibration algorithm, a 105×105 mm checkerboard with corner points in a number of 6×9 is used, a total of 13 sets of images are collected and the rotation parameters and translation parameters of a slave device 1 relative to a master device are computed, as shown in FIG. 4, where FIG. 4a shows an image collected by the master device, and FIG. 4b shows an image collected by the slave device 1.

TABLE 1

| Marker ID | Rotation/(°) | | | Translation/(m) | | |
| --- | --- | --- | --- | --- | --- | --- |
| | pitch | yaw | roll | X | Y | Z |
| 0 | 0 | 90 | 0 | 0.33 | 0 | −0.27 |
| 1 | 0 | −90 | 0 | −0.33 | 0 | −0.27 |
| 2 | 0 | 0 | 0 | 0 | 0 | 0 |
| 3 | 0 | −180 | 0 | 0 | 0 | −0.4 |

In order to avoid the influence of accidental errors, six experiments were carried out under the same conditions. Table 2 shows the results obtained by the classic Zhang's calibration algorithm and the calibration algorithm herein under the same conditions, and errors after comparison with manually-measured true values. The true values of translation of the slave device 1 relative to the master device are 1.64 m, 0.60 m, and 2.58 m; the true values of rotation are 32°, 125°, and 12°. In the six experiments, the classic Zhang's calibration algorithm has an average rotation error of 1.7222° and an average translation error of 0.2133 m; the average rotation error and translation average error of the algorithm in the present embodiment are 1.6111° and 0.0583 m, respectively, indicating that the algorithm has higher accuracy than the classic Zhang's calibration algorithm.

TABLE 2

| | Classic Zhang's calibration algorithm | | | | Algorithm of the present embodiment | | | |
| --- | --- | --- | --- | --- | --- | --- | --- | --- |
| Number of experiments | Euler angle (pitch/yaw/roll) | Rotation error | Translation distance (X/Y/Z) | Translation error | Euler angle (pitch/yaw/roll) | Rotation error | Translation distance (X/Y/Z) | Translation error |
| 1 | 31/123/16 | 2.333 3 | 1.32/0.44/2.69 | 0.196 7 | 30/125/14 | 1.333 3 | 1.56/0.63/2.52 | 0.056 7 |
| 2 | 31/125/15 | 1.333 3 | 1.25/0.47/2.71 | 0.216 7 | 30/125/15 | 1.666 7 | 1.56/0.62/2.51 | 0.056 7 |
| 3 | 30/125/15 | 1.666 7 | 1.25/0.46/2.71 | 0.220 0 | 30/126/17 | 2.666 7 | 1.56/0.56/2.52 | 0.060 0 |
| 4 | 30/125/15 | 1.666 7 | 1.25/0.45/2.71 | 0.223 3 | 34/126/12 | 1.000 0 | 1.57/0.57/2.52 | 0.053 3 |
| 5 | 31/124/15 | 1.666 7 | 1.28/0.45/2.70 | 0.210 0 | 31/125/16 | 1.666 7 | 1.56/0.58/2.52 | 0.053 3 |
| 6 | 31/124/15 | 1.666 7 | 1.26/0.46/2.70 | 0.213 3 | 30/124/13 | 1.333 3 | 1.56/0.65/2.50 | 0.070 0 |
| Average error | | 1.722 2 | | 0.213 3 | | 1.611 1 | | 0.058 3 |

After experimental analysis, the algorithm of the present disclosure has the following advantages. It is not required to collect multiple sets of images, which simplifies the calibration process; the algorithm has higher accuracy and less time consumption; marker production is simple, and the algorithm can be used in scenes with low overlap and no overlap of the camera's field of view.

Figure 5:
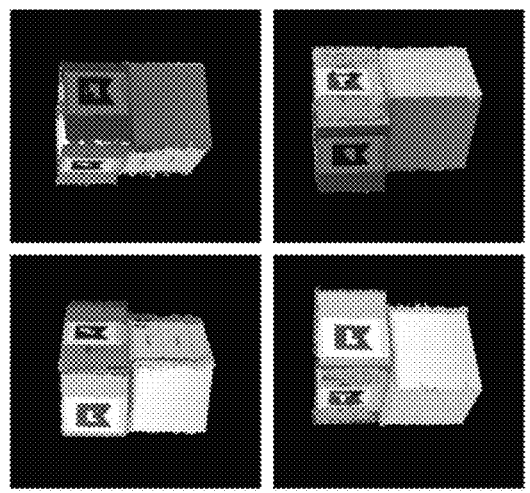
FIG. 5 is a schematic effect diagram of rough stitching of point clouds according to an exemplary embodiment of the present disclosure.
Figure 5:
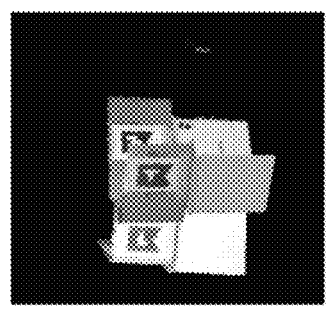
Figure 5:
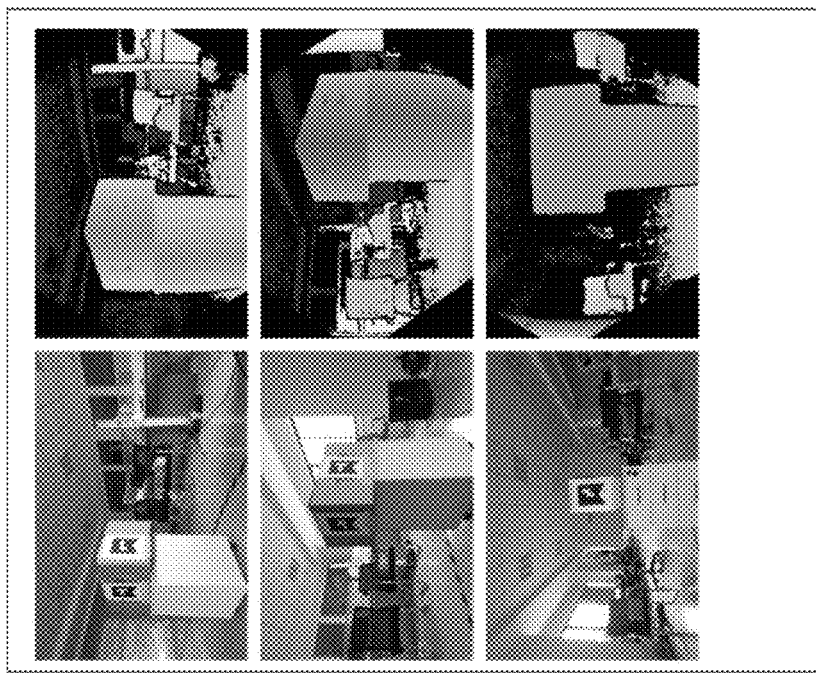

FIG. 5 shows a point cloud model after rough calibration. Since the manual prior will bring certain errors, the point cloud model has gaps under some viewing angles and needs to be further optimized.

Figure 6:
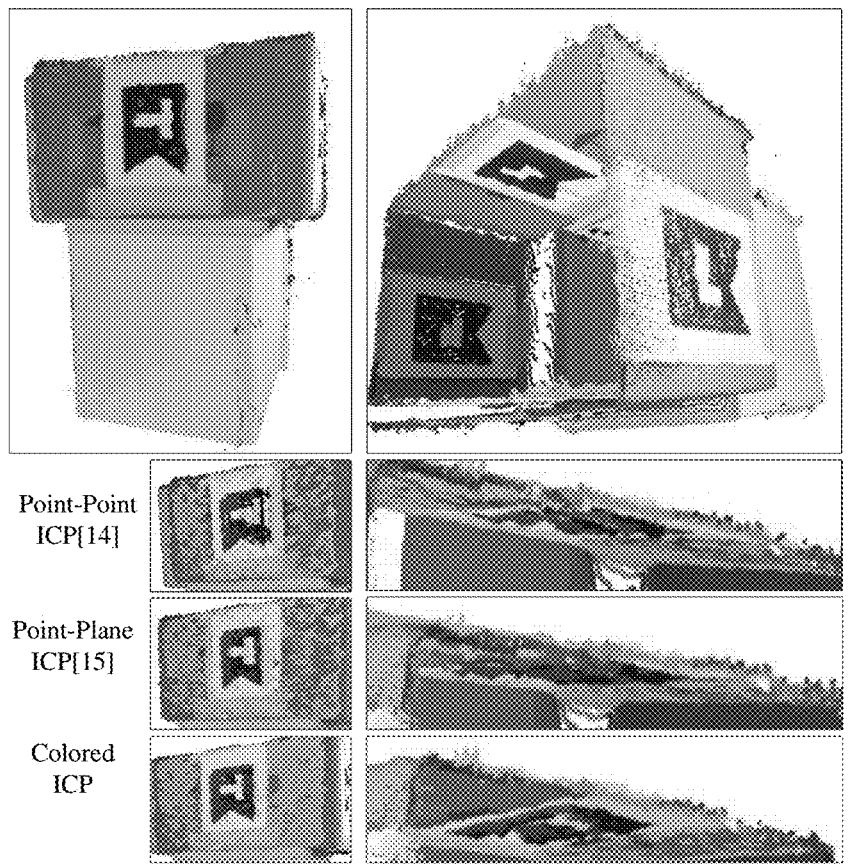
FIG. 6 is a schematic diagram of comparison of local optimization results of point clouds between an algorithm of the present disclosure and two traditional algorithms.

In the fine registration experiment of point cloud stitching, affected by the manual prior errors, the 3D model obtained by the coarse calibration is partially misaligned. Therefore, compared with the ICP variant algorithm for local optimization, it can be seen from FIG. 6 that under the same viewing angle, there are large gaps left on the surface of the carton after rough stitching. After iterative optimization using ICP, the surface of the model is smoother. In addition, it can be seen from the appearance of the marker in the right half of FIG. 6 that since the Colored-ICP algorithm makes better use of RGB information, the addition of color items has a regular effect on the registration and reduces mismatched points to a certain extent, thus achieving a better registration effect.

Figure 7:
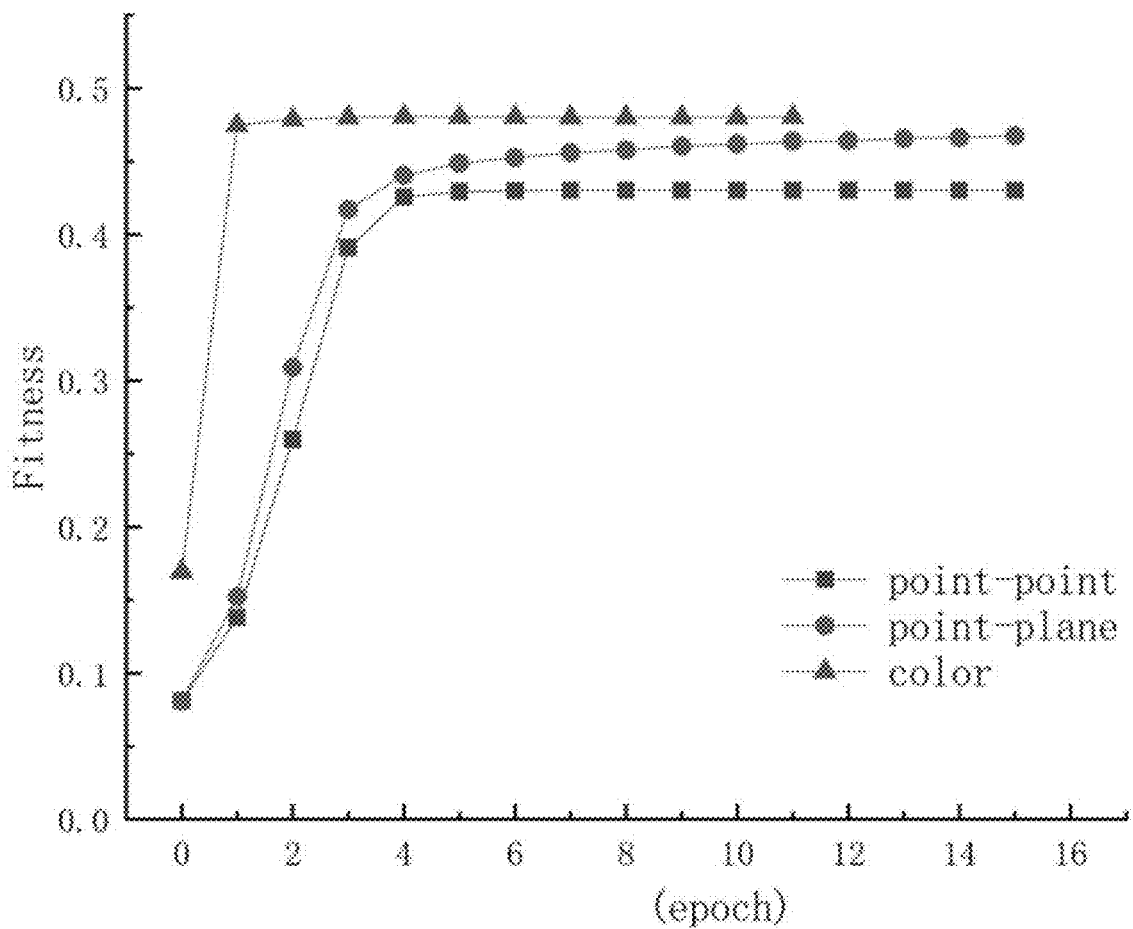
FIG. 7 is a schematic diagram of comparison of convergence speeds between a Colored-ICP algorithm according to an exemplary embodiment of the present disclosure and two traditional ICP algorithms.

In order to better compare the advantages of the Colored-ICP algorithm in terms of speed and accuracy, under the same iterative stop condition (the maximum epoch is 30, and the root mean square error RMSE is less than 1e-6), a similarity curve is drawn; as shown in FIG. 7, when the corresponding point set $(p,q) \in \mathcal{M}$ is about 30,000, the Colored-ICP algorithm not only has the highest convergence speed (only needs 4 rounds of iterations), highest similarity, Fitness≈0.4802, which are all better than those of the traditional ICP algorithm.

In this embodiment, mixed reality experiments were also carried out based on the 3D reconstruction method. As an emerging technology, remote immersion allows users to carry out remote collaboration through real 3D representations generated in real time and placed in a shared virtual space. As a verification experiment, in the present embodiment, the TCP/IP communication protocol is used to upload the point cloud data to the Hololens2 terminal in real time, and then a Unity3D particle system is used to perform grid rendering of the 3D model. In addition, the RGB image resolution is down-sampled to the Depth image resolution, and a GZip decompression program is embedded on the HoloLens2 terminal, which further reduces transmission bandwidth pressure and improves the display frame rate.

Figure 8:
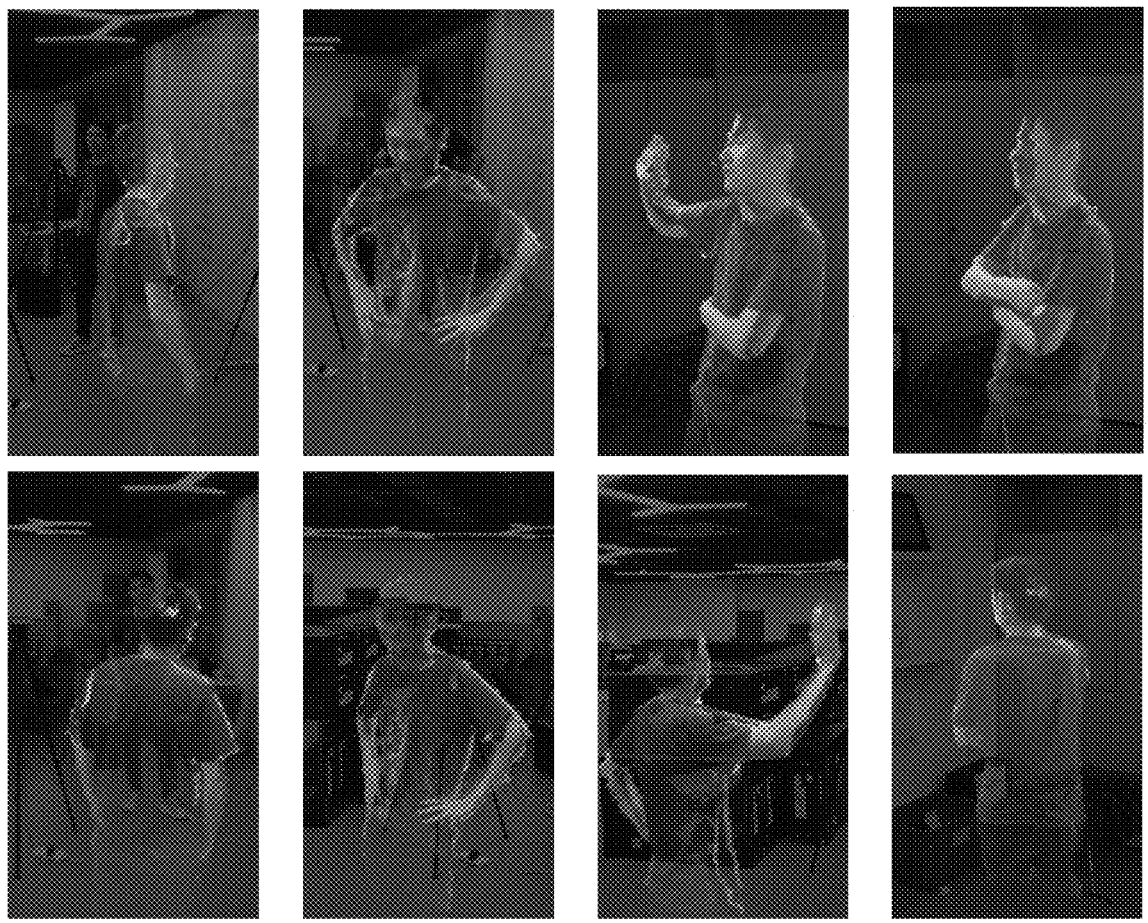
FIG. 8 shows a display effect of HoloLens2 under different actions according to an exemplary embodiment of the present disclosure.

FIG. 8 shows the real-time reconstruction effect of a glasses terminal when the human body does different actions in a scene. It can be seen from FIG. 8 that a virtual human body model at the Hololens2 terminal maintains high synchronization with the real human body under different actions, and detailed features such as facial expressions, finger joints, and clothes texture are also clearly reconstructed; however, due to the influence of sensor sampling noise, illumination and other factors, the holes and chromatic aberration on the surface of the model are the directions for the next optimization. Table 3 shows the comparison of model data and frame rate under different actions. In the absence of GPU acceleration, through the addition of data downsampling and compression algorithms, an average display refresh rate of 25 fps on the HoloLens2 terminal is reached, which basically guarantees the real-time performance of the system.

TABLE 3

| Action | Number of points | Data size (M) After compression/decompression | Frame rate (fps) |
| --- | --- | --- | --- |
| Turn around | 168 367 | 0.74/1.45 | 23 |
| Nod | 156 684 | 0.69/1.34 | 27 |
| Wave | 175 683 | 0.81/1.51 | 25 |
| Cross arms | 163 075 | 0.73/1.40 | 28 |

In some optional embodiments of the present disclosure, the identifying the ID number of the marker in the symbol image includes:
  performing gray-scale processing and binarization processing on the symbol image in sequence to obtain a binary image of the symbol;
  performing ROI area extraction and corner detection on the binary image of the symbol to obtain the marker; and
  identifying the ID number of the marker according to values of black and white pixels in a coded area of the marker.

In some optional embodiments of the present disclosure, the performing ROI area extraction and corner detection on the binary image of the symbol to obtain the marker includes:
  performing contour query on the binary image of the symbol to obtain multiple contours, each of the contours being composed of a set of continuous points;
  traversing each of the contours and computing a bounded area; and
  when the bounded area is outside a preset range, determining that a polygon is not a marker, and calling a polygon fitting function to detect a number of corners on each of the contours; if it is detected that the number of corners on the contour is 5 and a polygon fitted from the contour is a non-convex polygon, determining that the polygon fitted from the contour is a marker.

In some optional embodiments of the present disclosure, the identifying the ID number of the marker according to the values of black and white pixels in the coded area of the marker includes:
  computing a total value of pixels in the coded area of the marker; and
  performing decoding according to the total value of pixels to obtain the ID number.

In some optional embodiments of the present disclosure, the computing the external parameter matrix of the camera according to the marker coordinates of the camera coordinate system and the marker coordinates of a world coordinate system and unifying point clouds under the world coordinate system to obtain a plurality of point clouds under different viewing angles includes:
  under each viewing angle k, defining a translation vector $T_C^k$ ($T_C^k \in R^{3\times1}$), defining a rotation matrix $R_C^k$ ($R_C^k \in R^{3\times3}$), transformation between the camera coordinate system and the world coordinate system being done as follows:

$$P_M^k = R_c^k(P_C^k - T_c^k);$$

where $P_C^k$ and $P_M^k$ represent a point cloud model of the marker under the camera coordinate system and a point cloud model of the marker under the world coordinate system, respectively; a subscript C represents the camera coordinate system and a subscript M represents the world coordinate system;

the translation vector $T_C^k$ represents center coordinates of the world coordinates computed according to a 3D corner $\hat{V}_k^j$;

obtaining the rotation matrix $R_C^k$ by using orthogonal Procrustes analysis; and detecting the marker, obtaining a corresponding pre-input position prior through the ID number, and unifying the point clouds under the world coordinate system as follows:

$$P_W^k = R_M^k P_M^k + T_M^k;$$

where $P_W^k$ represents the point cloud model under the world coordinate system, and a subscript W represents the camera coordinate system; $R_M^k$ and $T_M^k$ represent a rotation parameter and a translation parameter, respectively.

In some optional embodiments of the present disclosure, the stitching the plurality of point clouds together to obtain a 3D reconstructed image includes:

stitching the point clouds under different viewing angles based on a Colored-ICP algorithm, wherein Colored-ICP is expressed as follows:

$$\varepsilon(T) = (1-\delta)\varepsilon_C(T) + \delta\varepsilon_G(T);$$

where $T \in SE(3)$, $SE(3)$ represents an estimated transformation matrix, $\varepsilon_C$ represents a color term, $\varepsilon_G$ represents a geometric term, and $\delta \in [0,1]$ represents a weight variable; the selection of the corresponding point pair $(p,q) \in \mathcal{M}$ is the same as that in an ICP algorithm, which is to minimize the Euclidean distance of points; for a corresponding point set $\mathcal{M}$, respectively constructing the geometric term and the color term of an objective function as follows:

$$\varepsilon_G(T) = \Sigma_{(p,q)\in\mathcal{M}}((Tq-p)^T n_p)^2;$$

$$\varepsilon_C(T) = \Sigma_{(p,q)\in\mathcal{M}}(C_p(f(Tq)) - C(q))^2;$$

where $n_p$ represents a normal vector of the corresponding point p; $\varepsilon_G$ is equivalent to a distance from a source point to a tangent plane of a target point; f( ) is a function for back-projecting a 3D point to the tangent plane of the target point cloud; $C_p($ ) is a function for parameterizing a virtual image, and C( ) is a color value of a corresponding coordinate.

In some optional embodiments of the present disclosure, subsequent to the step of stitching the plurality of point clouds together to obtain a 3D reconstructed image, the 3D reconstruction method further includes:

iteratively optimizing the 3D reconstructed image by using a Gauss-Newton method.

It should be noted that, in the 3D reconstruction method according to the embodiments of the present disclosure, the execution subject may be a 3D reconstruction apparatus, or a control module for performing the 3D reconstruction method in the 3D reconstruction apparatus. In an embodiment of the present disclosure, a method for performing 3D reconstruction by a 3D reconstruction apparatus is taken as an example to illustrate the 3D reconstruction apparatus according to the embodiment of the present disclosure.

Figure 9:
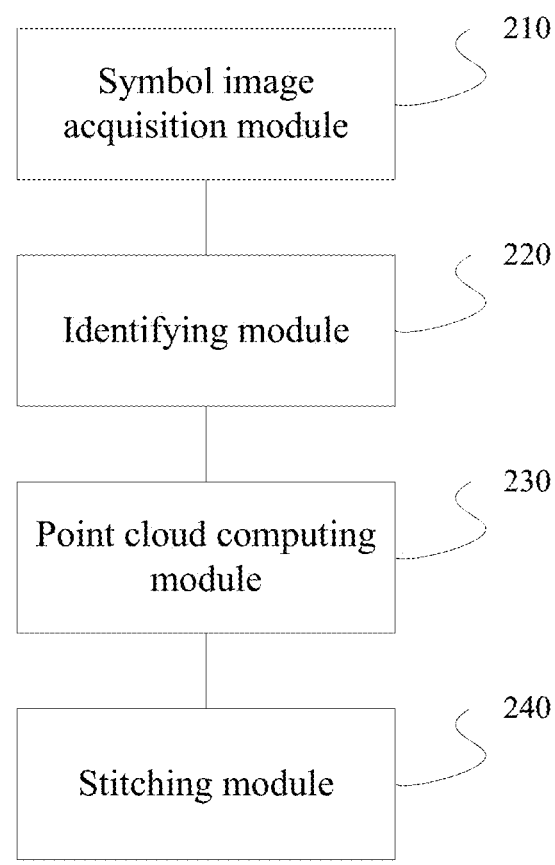
FIG. 9 is a schematic structural diagram of a 3D reconstruction apparatus according to an exemplary embodiment of the present disclosure.

As shown in FIG. 9, according to a second aspect of embodiments of the present disclosure, a 3D reconstruction apparatus is provided, and the apparatus may include:

a symbol image acquisition module 210, configured to use a plurality of cameras with different viewing angles to image a symbol to obtain a symbol image, a reference object for camera calibration being called the symbol, the symbol including a plurality of markers, and each of the markers having a corresponding ID number;

an identifying module 220, configured to identify the ID number of the marker in the symbol image and search for world coordinates corresponding to the marker according to the ID number;

a point cloud computing module 230, configured to compute an external parameter matrix of the camera according to marker coordinates of a camera coordinate system and marker coordinates of a world coordinate system, and unify point clouds under the world coordinate system to obtain a plurality of point clouds under different viewing angles; and a stitching module 240, configured to stitch the plurality of point clouds together to obtain a 3D reconstructed image.

According to the device of the above embodiment, the input marker ID (ID number) and the rotation angle and translation distance under the corresponding world coordinate system are used as priors; extraction is performed for marker detection and ID identification; corresponding transformation parameters are retrieved according to the identified ID, a corresponding external parameter matrix is computed in combination with the analysis and inverse operation, and the 3D reconstruction is realized through stitching. The method has faster convergence and higher accuracy, and the method is simple in process and easy to operate and implement.

The 3D reconstruction apparatus in the embodiment of the present disclosure may be a device and may also be a component, an integrated circuit, or a chip in a terminal. The apparatus may be a mobile electronic device or a non-mobile electronic device. As an example, the mobile electronic device may be a mobile phone, a tablet computer, a notebook computer, a palmtop computer, a vehicle electronic device, a wearable device, an ultra-mobile personal computer (UMPC), a netbook, a personal digital assistant (PDA), or the like, and the non-mobile electronic device may be a server, a network attached storage (NAS), a personal computer (PC), a television (TV), a teller machine, a self-service machine, or the like, and they are not specifically limited in the embodiments of the present disclosure.

The 3D reconstruction apparatus in the embodiments of the present disclosure may be a device with an operating system. The operating system may be an Android operating system, an ios operating system, or other possible operating systems, and it is not specifically limited in the embodiments of the present disclosure.

The 3D reconstruction apparatus according to the embodiments of the present disclosure can implement the various processes implemented by the method embodiment in FIG. 1, which are not repeated here to avoid repetition.

Figure 10:
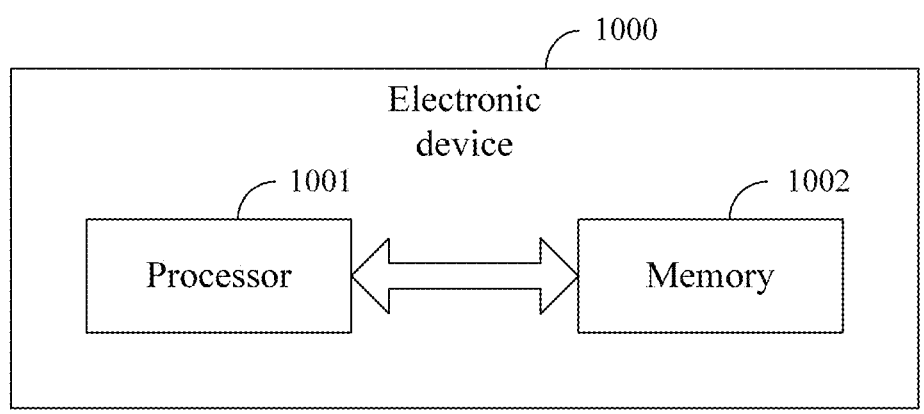
FIG. 10 is a schematic structural diagram of an electronic device according to an exemplary embodiment of the present disclosure.

Optionally, as shown in FIG. 10, an embodiment of the present disclosure further provides an electronic device 1000, including a processor 1001, a memory 1002, and a program or instruction that is stored in the memory 1002 and can run on the processor 1001. When executed by the processor 1001, the program or instruction implements various processes of the above-mentioned 3D reconstruction method embodiment, and the same technical effect can be achieved. In order to avoid repetition, it will not be repeated here.

It should be noted that the electronic device in the embodiments of the present disclosure includes the above-mentioned mobile electronic device and non-mobile electronic device.

Figure 11:
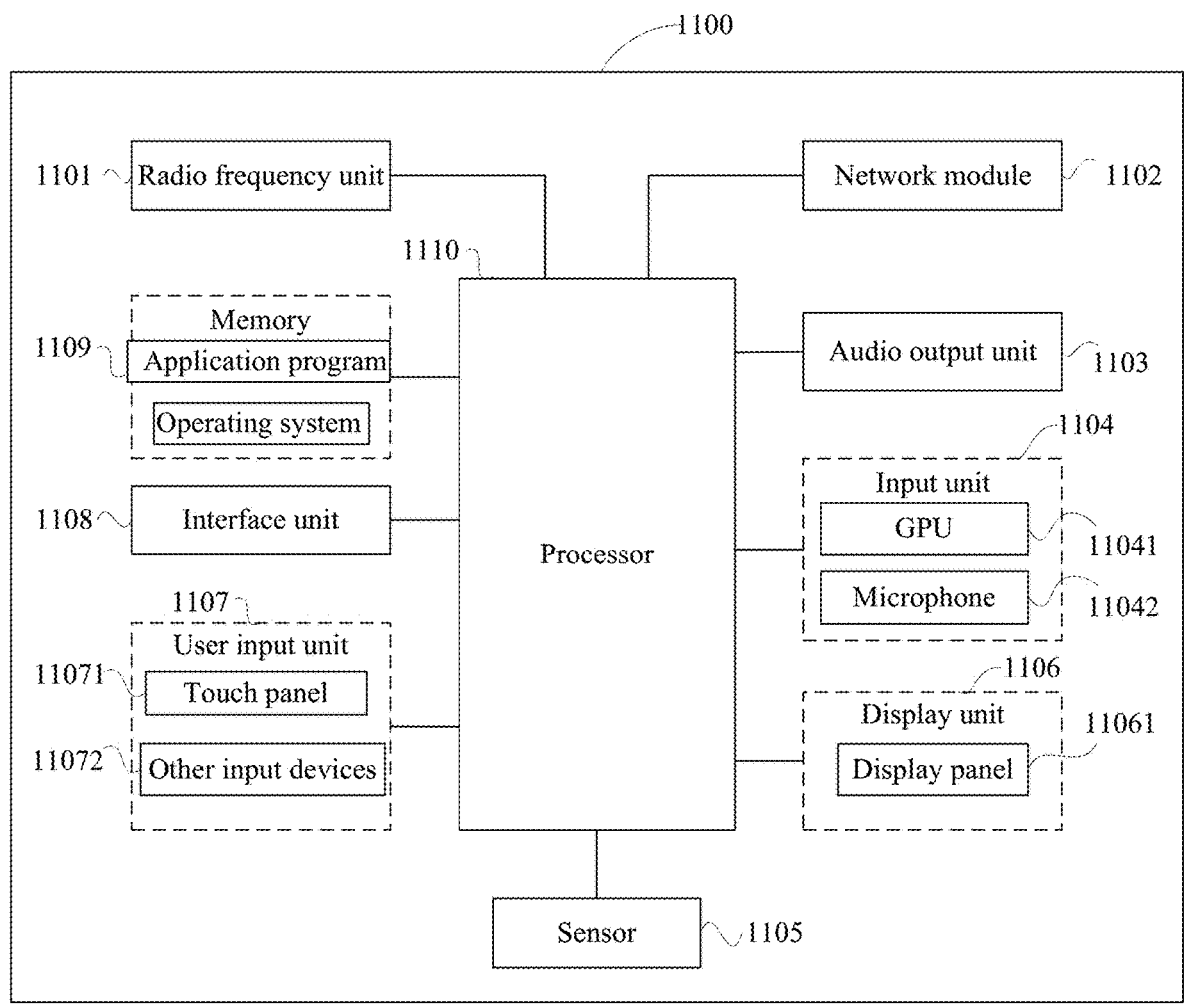
FIG. 11 is a schematic structural diagram of hardware in an electronic device according to an exemplary embodiment of the present disclosure.

FIG. 11 is a schematic structural diagram of hardware in an electronic device according to the embodiment of the present disclosure.

The electronic device 1100 includes, but is not limited to: a radio frequency unit 1101, a network module 1102, an audio output unit 1103, an input unit 1104, a sensor 1105, a display unit 1106, a user input unit 1107, an interface unit 1108, a memory 1109, a processor 1110, and other components.

Those skilled in the art can understand that the electronic device 1100 may further include a power supply (e.g., a battery) for supplying power to various components. The power supply may be logically connected to the processor 1110 through a power management system, so that the power management system can function to manage charging, discharging, power consumption and the like. The structure of the electronic device shown in FIG. 11 does not constitute a limitation on the electronic device. The electronic device may include more or less components than those shown in the figure, or combine some components or have different component arrangements, which will not be repeated here.

It should be understood that, in the embodiment of the present disclosure, the input unit 1104 may include a graphics processing unit (GPU) 11041 and a microphone 11042. The GPU 11041 processes image data of static pictures or videos obtained by an image capture device (such as a camera) in a video capture mode or an image capture mode. The display unit 1106 may include a display panel 11061, and the display panel 11061 may be configured in the form of a liquid crystal display, an organic light emitting diode, or the like. The user input unit 1107 includes a touch panel 11071 and other input devices 11072. The touch panel 11071 is also called a touch screen. The touch panel 11071 may include two parts, i.e., a touch detection device and a touch controller. Other input devices 11072 may include, but are not limited to, a physical keyboard, a function button (such as a volume control button, a switch button, and the like), a trackball, a mouse, and a joystick, which will not be repeated here. The memory 1109 may be configured to store software programs and various data, including, but not limited to application programs and operating systems. The processor 1110 may integrate an application processor and a modem processor. The application processor mainly processes an operating system, a user interface, an application program and the like, and the modem processor mainly processes wireless communication. It can be understood that the foregoing modem processor may not be integrated into the processor 1110.

An embodiment of the present disclosure further provides a readable storage medium having a program or instruction stored thereon. When executed by a processor, the program or instruction implements various processes of the above-mentioned 3D reconstruction method embodiment, and the same technical effect can be achieved. In order to avoid repetition, it will not be repeated here.

The processor is the processor in the electronic device described in the foregoing embodiment. The readable storage medium includes a computer readable storage medium, such as a computer read-only memory (ROM), a random access memory (RAM), a magnetic disk, an optical disk, or the like.

An embodiment of the present disclosure further provides a chip, including a processor and a communication interface; the communication interface is coupled with the processor; the processor is configured to run a program or an instruction to implement various processes of the above-mentioned 3D reconstruction method embodiment, and the same technical effect can be achieved. In order to avoid repetition, it will not be repeated here.

It should be understood that the chip mentioned in the embodiment of the present disclosure may also be referred to as a system-level chip, system-on-chip, system-on-chip, system-on-chip, or the like.

It should be noted that the term "include", "comprise" or any other variations thereof herein are intended to cover non-exclusive inclusions such that a process, method, article, or device that includes a series of elements not only includes those elements but also includes other elements that are not listed explicitly, or also include inherent elements of the process, method, article, or device. If there are no more restrictions, the element defined by the sentence "including a/an . . . " does not exclude the existence of other identical elements in the process, method, article, or device that includes the element. In addition, it should be noted that the scope of the method and apparatus in the embodiments of the present disclosure is not limited to performing functions in the order shown or discussed, and may also include performing functions in a substantially simultaneous manner or in a reverse order according to the functions involved. For example, the described method may be performed in an order different from the described order, and various steps may also be added, omitted, or combined. In addition, features described with reference to certain examples may be combined in other examples.

Through the description of the above embodiments, those skilled in the art can clearly understand that the methods of the above embodiments can be implemented by means of software plus a necessary general hardware platform, and of course can also be implemented by hardware, but the former is a better implementation in many cases. Based on this understanding, the technical solution of the present disclosure, in essence or for the part contributing to the prior art, may be embodied in the form of a computer software product. The computer software product is stored in a storage medium (such as a ROM/RAM, a magnetic disk, or an optical disk) and includes several instructions to enable a terminal (which can be a mobile phone, a computer, a server, a network device, or the like) to execute the methods described in various embodiments of the present disclosure.

The embodiments of the present disclosure are described above in conjunction with the accompanying drawings, but the present disclosure is not limited to the above-mentioned specific embodiments. The above-mentioned specific embodiments are only illustrative and not restrictive. Under the enlightenment of the present disclosure, those of ordinary skill in the art can make many forms without departing from the concept of the present disclosure and the scope of the appended claims, all of which fall within the protection scope of the present disclosure.

What is claimed is:

1. A 3D reconstruction method, comprising:
   using a plurality of cameras with different viewing angles to image a symbol to obtain a symbol image, a reference object for camera calibration being called the symbol, the symbol comprising a plurality of markers, and each of the markers having a corresponding ID number;
   performing gray-scale processing and binarization processing on the symbol image in sequence to obtain a binary image of the symbol; performing ROI area extraction and corner detection on the binary image of the symbol, and according to the extracted contour area and its concave and convex properties, and the number of corners to judge and obtain the marker; and
   identifying the ID number of the marker according to values of black and white pixels in a coded area of the marker and searching for world coordinates corresponding to the marker according to the ID number;

computing an external parameter matrix of the camera according to marker coordinates of a camera coordinate system and marker coordinates of a world coordinate system, and unifying point clouds under the world coordinate system to obtain a plurality of point clouds under different viewing angles; and stitching the plurality of point clouds together to obtain a 3D reconstructed image.

2. The 3D reconstruction method according to claim 1, wherein the performing ROI area extraction and corner detection on the binary image of the symbol, and according to the extracted contour area and its concave and convex properties, and the number of corners to judge and obtain the marker comprises:

performing contour query on the binary image of the symbol to obtain multiple contours, each of the contours being composed of a set of continuous points;

traversing each of the contours and computing a bounded area; and when the bounded area is outside a preset range, determining that a polygon is not a marker, and calling a polygon fitting function to detect a number of corners on each of the contours; if it is detected that the number of corners on the contour is 5 and a polygon fitted from the contour is a non-convex polygon, determining that the polygon fitted from the contour is a marker.

3. The 3D reconstruction method according to claim 1, wherein the identifying the ID number of the marker according to the values of black and white pixels in the coded area of the marker comprises:

computing a total value of pixels in the coded area of the marker; and performing decoding according to the total value of pixels to obtain the ID number.

4. The 3D reconstruction method according to claim 1, wherein the computing the external parameter matrix of the camera according to the marker coordinates of the camera coordinate system and the marker coordinates of a world coordinate system, and unifying the point clouds under the world coordinate system to obtain a plurality of point clouds under different viewing angles comprises:

under each viewing angle k, defining a translation vector $T_c^k$ ($T_c^k \in R^{3\times 1}$), and defining a rotation matrix $R_c^k$ ($R_c^k \in R^{3\times 3}$), transformation between the camera coordinate system and the world coordinate system being done as follows:

$$P_M^k \hat{A} = R_c^k (P_C^k - T_c^k);$$

where $P_C^k$ and $P_M^k$ represent a point cloud model of the marker under the camera coordinate system and a point cloud model of the marker under the world coordinate system, respectively; a subscript C represents the camera coordinate system and a subscript M represents the world coordinate system;

the translation vector $T_c^k$ represents center coordinates of the world coordinates computed according to a 3D corner $\hat{V}_k^j$;

obtaining the rotation matrix $R_c^k$ by using orthogonal Procrustes analysis; and detecting the marker, obtaining a corresponding pre-input position prior through the ID number, and unifying the point clouds under the world coordinate system as follows:

$$P_W^k = R_M^k P_M^k + T_M^k;$$

where $P_W^k$ represents the point cloud model under the world coordinate system, and a subscript W represents the camera coordinate system; TX and M represent a rotation parameter and a translation parameter, respectively.

5. The 3D reconstruction method according to claim 1, wherein the stitching the plurality of point clouds together to obtain a 3D reconstructed image comprises:

stitching the point clouds under different viewing angles based on a Colored-ICP algorithm, wherein the Colored-ICP is expressed as follows:

$$\varepsilon(T) = (1-\delta)\varepsilon_C(T) + \delta\varepsilon_G(T);$$

where $T \in SE(3)$, $SE(3)$ represents an estimated transformation matrix, $\varepsilon_C$ represents a color term, $\varepsilon_G$ represents a geometric term, and $\delta \in [0,1]$ represents a weight variable; selection of a corresponding point pair $(p, q) \in M$ is the same as that in an ICP algorithm, which is to minimize a Euclidean distance of points; for a corresponding point set M, respectively constructing the geometric term and the color term of an objective function as follows:

$$\varepsilon_G(T) = \Sigma_{(p,q) \in M}((Tq-p)^T n_p)^2;$$

$$\varepsilon_C(T) = \Sigma_{(p,q) \in M}(C_p(f(Tq)) - C(q))^2;$$

$n_p$ where represents a normal vector of the corresponding point p; $\varepsilon_G$ is equivalent to a distance from a source point to a tangent plane of a target point; f( ) is a function for back-projecting a 3D point to the tangent plane of the target point cloud; $C_p$( ) is a function for parameterizing a virtual image, and C( ) is a color value of a corresponding coordinate.

6. The 3D reconstruction method according to claim 1, wherein subsequent to the step of stitching the plurality of point clouds together to obtain a 3D reconstructed image, the 3D reconstruction method further comprises:

iteratively optimizing the 3D reconstructed image by using a Gauss-Newton method.

7. An electronic device, comprising: a processor, a memory, and a program or instruction stored on the memory and capable of being run on the processor, the program or instruction being executed by the processor to implement steps of the 3D reconstruction method according to claim 1.

8. A non-transitory computer readable storage medium having a computer program or instruction stored thereon, the computer program or instruction being executed by a processor to implement steps of the 3D reconstruction method according to claim 1.

9. A 3D reconstruction apparatus, comprising:

a symbol image acquisition module, configured to use a plurality of cameras with different viewing angles to image a symbol to obtain a symbol image, a reference object for camera calibration being called the symbol, the symbol comprising a plurality of markers, and each of the markers having a corresponding ID number;

an identifying module, configured to perform gray-scale processing and binarization processing on the symbol image in sequence to obtain a binary image of the symbol; perform ROI area extraction and corner detection on the binary image of the symbol, and according to the extracted contour area and its concave and convex properties, and the number of corners to judge and obtain the marker; and identify the ID number of the marker according to values of black and white pixels in a coded area of the marker and search for world coordinates corresponding to the marker according to the ID number;

a point cloud computing module, configured to compute an external parameter matrix of the camera according to marker coordinates of a camera coordinate system and marker coordinates of a world coordinate system, and unify point clouds under the world coordinate system to obtain a plurality of point clouds under different viewing angles; and a stitching module, configured to stitch the plurality of point clouds together to obtain a 3D reconstructed image.

* * * * *